United States Patent [19]

Enikolopow et al.

[11] Patent Number: 4,607,797

[45] Date of Patent: Aug. 26, 1986

[54] METHOD AND APPARATUS FOR PULVERIZING POLYMERS

[75] Inventors: Nikolai S. Enikolopow; Stanislaw A. Wolfson; Anatolie I. Nepomnjaschtschie; Wadim G. Nikolskie; Wiktor A. Teleschow; Lidia A. Filmakowa, all of Moscow, U.S.S.R.; Heinz Brinkmann, Bennigsen, Fed. Rep. of Germany; Eckart Pantzer, Isernhagen, Fed. Rep. of Germany; Eberhard Uhland, Burgdorf, Fed. Rep. of Germany

[73] Assignees: NPO Norplast, U.S.S.R.; Hermann Berstorff Maschinenbau GmbH, Fed. Rep. of Germany

[21] Appl. No.: 648,286

[22] Filed: Sep. 7, 1984

[30] Foreign Application Priority Data

Sep. 9, 1983 [DE] Fed. Rep. of Germany ....... 3332629

[51] Int. Cl.⁴ ............................................ B02C 19/12
[52] U.S. Cl. .................................. 241/23; 241/260.1; 425/208; 425/379 R
[58] Field of Search ............... 425/378 R, 379 R, 203, 425/204, 207, 208; 241/260.1, 261, 65, 23, 66, 67; 159/2 E

[56] References Cited

U.S. PATENT DOCUMENTS 3,382,536  5/1968  Fritsch et al. .................. 425/204 X
3,431,599  3/1969  Fogelberg ..................... 425/379 R X
3,551,943  1/1971  Staton et al. ................. 425/379 R X

FOREIGN PATENT DOCUMENTS 1090422  10/1960  Fed. Rep. of Germany .
1229709  12/1966  Fed. Rep. of Germany .

OTHER PUBLICATIONS

Karl-Martin Hess, *Maschinen, Verarbeitung und Anwendung*, "Kontinuierliches Herstellen von Kunststoff-Beschichtungspulvern"; vol. 64 (1974), Book 2, pp. 54–57.

*Primary Examiner*—Mark Rosenbaum
*Attorney, Agent, or Firm*—Schwartz, Jeffery, Schwaab, Mack, Blumenthal & Evans

[57] ABSTRACT

A method and apparatus for pulverizing polymers. The apparatus comprises a hollow barrel within which at least one screw rotates. The interior of the hollow barrel is divided into a plurality of zones. Heating members are associated with a first of these zones and cooling members are associated with at least a second of these zones. Pre-crushing and pulverizing members are also disposed in said second zone. In the method, polymeric material is fed into the first zone of the hollow barrel and is fused therein. The fused material is then conveyed into the second zone wherein it is cooled, pre-crushed and pulverized. The powdered polymeric material is then discharged from said second zone. The method can therefore be effected continuously in a single apparatus.

6 Claims, 5 Drawing Figures

METHOD AND APPARATUS FOR PULVERIZING POLYMERS

FIELD OF THE INVENTION

The present invention relates to a method of pulverising polymers and to a single- or multi-screw extrusion device suitable for carrying out such a method.

BACKGROUND OF THE INVENTION AND PRIOR ART DISCUSSION

One method of producing fine powder from polyethylene is described in German Auslegeschrift No. 1 229 709. This method is based on the treatment of solids to form granules, sheets and other forms of small particles in which the solid is pulverised, in a dry state, by comminution. By introducing a so-called crushing pressure in a roller gap, the solids are comminuted. However, it is often necessary to carry out four to six passes of the material through a roller gap provided with heated rollers to achieve satisfactory comminution. Subsequently, the material is comminuted in a mill which has also been heated to approximately the same temperature as the heated rollers, that is to say, between 75° C. and 80° C.

Such prior specification also describes the chemico-physical phenomenon that the molecular bonding of the polyethylene chains are loosened by use of a crushing pressure in a roller gap in a predetermined temperature range. This phenomenon makes it possible to break down polyethylene and to convert it into a fine powder. However, this method has not proved successful in practice. Firstly, the amount of energy required to comminute a solid material is considerable, particularly if the material has a high tensile strength. In addition, it is very energy-consuming, and therefore uneconomic, to heat solid polyethylene to a temperature of between 70° C. and 80° C. (as described in Example 1 of German Auslegeschrift No. 1229709) or even to a temperature of between 100° C. and 105° C. (Example 2 of such specification) both when heat is introduced by thermal conduction from externally to the interior of the solid particles, and when the heat is introduced by friction heating in the roller gap. A relatively long period of time is required in both cases.

In short, therefore, it may be stated that this fine grinding method is uneconomic because of the high energy consumption necessary to pulverise a solid and to heat the solid to a suitable temperature, the number of different types of machines needed, the discontinuity of the method due to the necessity of effecting a number of repeated passes through both a rolling mill and a grinding mill and the time-consuming, and thus industrially inefficient, nature of the method.

However, German Auslegeschrift No. 1 090 422 describes a method of pulverising or fine-grinding polyolefins which are in the form of a fused mass. By way of example, polyethylene is fused in a discontinuous kneading device which operates with a stamping or punch pressure. The wall of the kneading device and the kneading blades themselves are tempered with superheated steam at a temperature of up to 200° C.

The fused mass is then rapidly cooled to a temperature of not more than 10° C. Simultaneously, the speed of the kneading blades and the stamping or punch pressure are each reduced by approximately 50%.

This method is, however, also discontinuous and suffers from certain disadvantages which make it unsuitable for industrial use.

In this respect, it is firstly necessary to point out that large amounts of energy are wasted when a molten polyethylene mass is quenched from 200° C. to 10° C. This is chiefly due to extremely poor thermal conductivity of polyethylene. It will also be evident that cooling of this nature takes time which is a further disadvantage. These two disadvantages alone render the industrial utilisation of such method unsuitable.

However, in addition, the reduction of the speed of rotation of the kneading blades slows down the pulverising process to a disadvantageous rate and the mechanical equipment cannot, therefore, be operated continuously.

On the other hand, there has been a long-felt desire for obtaining polymers in powder form, because powder coatings on, for example, pipes to protect the pipes against corrosion are very much in demand. However, a powder having a uniform grain or particle size (DIN 55 990) is necessary on an industrial scale to enable a wide range of powder lacquers to be produced. Hitherto, however, the obtaining of such a powder has only been possible using a complicated process involving the use of a large number of separate machines.

In "Kunststoffe" (Volume 64 (1974), Book 2, Pages 54 to 57), a method is described for producing coating powders from plastics materials. FIG. 1 on Page 55 of this journal illustrates an apparatus used for carrying out such a method, the apparatus including a preliminary mixer E, a metering device F, a double-shafted screw kneading device G having a discharge housing H, two cooling rollers I, a cooling drum K, an additional pair of crushing rollers M and an additonal pulveriser O.

The polymer is fused in the double-shafted screw kneading device and is then transferred to a rolling mill by means of a wide-mounted nozzle. In the rolling mill, a crushing pressure is exerted on the material. The large cooling roller which is disposed downstream thereof provides additional cooling. The cooled material is then conveyed to a preliminary comminution device to produce substantially chip-like particles which are subsequently conveyed into the grinding and screening apparatus.

It is readily apparent that such a method is complicated and laborious and must, therefore, be uneconomic.

OBJECTS OF THE PRESENT INVENTION

The present invention seeks to provide a method and an apparatus, by means of which fused polymers may be pulverised economically and continuously. The invention also seeks to provide an energy-efficient process and apparatus which still permits a high powder output to be achieved continuously with the particles having a very uniform grain size. In addition, the present invention seeks to minimize the number of machines required to carry out pulverisation or fine-grinding.

SUMMARY OF THE INVENTION

According to the present invention, there is provided a method of producing a powder from polymeric material in an extrusion device, said extrusion device comprising a barrel, said barrel having an internal surface, said internal surface defining a hollow cavity extending longitudinally within said barrel, at least one screw means rotatable in, and extending longitudinally with respect to, said hollow cavity, said barrel having opposed first and second end regions, polymeric material feed means disposed in said first end region, said feed means communicating with said hollow cavity, powder discharge means disposed in said second end region, said discharge means also communicating with said hollow cavity, said hollow cavity, intermdiate said first and second end regions, being divided into at least first and second zones, heating means in thermal communication with at least said first zone and cooling means in thermal communication with at least said second zone, comprising the steps of feeding said polymeric material through said feed means into said first zone, fusing said material, conveying said fused material into said second zone, cooling said material in said second zone, pre-crushing and pulverising said material in said hollow cavity and discharging said powder from said second end region whereby said method is continuous and said fusion, cooling, precrushing and pulverisation are effected in a single extrusion device.

The fusion operation may be achieved by heating the cylinder in the first zone of, for example, a twin-screw extrusion and by simultaneously introducing shearing energy, by the driving force of the screws, into the material. The material being powdered is, in a preferred embodiment, polyethylene and is desirable fed into the extrusion device in granular form.

The cooling process occurs in the second zone. The fused material is thus cooled to a temperature below the solidification temperature of the fused mass, whilst the pre-crushing and pulverising processes are carried out simultaneously with such cooling.

Even if the polymers have additives admixed therewith, the process of the present invention still results in efficient pulverisation. If desired, the fused mass may be degassed.

Since the cooling process sequentially follows the fusion process in the extrusion device and instigates the pre-crushing and pulverisation operations, the pulverisation of polymer materials can be carried out wholly continuously.

Hitherto, care has been taken to avoid cooling a fused mass of plastics material in an extrusion device to below a predetermined temperature which is above the solidification temperature. This is because it has been assumed that, if the plastics material solidifies in the extruder barrel, it would no longer be possible to rotate the screw in the barrel or even that the screw would break. In consequence, the extrusion devices have, hitherto always been cooled very carefully and slowly so as to remove the possibility of damaging the screw.

It has now been found that if a fused polymer mass is cooled to below its solidification temperature in an extrusion device immediately after it has been fused, the extrusion device can be used to pre-crush and pulverise or finely grind the polymer. In other words, pulverisation can be effected without risking breakage of the screw or without the continuity of the pulverisation process.

In an advantgeous manner, the cooling is effected to a temperature of between 1.5° C. and 100° C., more especially between 3° C. and 40° C. and ideally approximately 10° C., below the solidification temperature of the polymer. These temperatures are dependant, to a certain extent, on the physical properties of the polymer being treated.

It has been surprising to find that the amount of energy which is needed to carry out the pulverisation process of the present invention is much lower than the energy requirements of the individual machines used in known methods. It would, however, be obvious to any skilled engineer that the total energy required for using a known twin-screw extruder (solely for the fusion process) a cooling rolling mill, a crushing rolling mill and a pulveriser would be considerably higher.

However, the energy required to carry out the process of the present invention is even less than expected. This is presumably attributable to the fact that the polymers to be pulverised are only cooled down to slightly below their solidification temperatures and hence only relatively little energy needs to be used for the cooling process. On the other hand, the pulverising process itself requires little energy since the molecular bonding of the polymer is presumably loosened in this temperature range.

It is desirable if the pulverising process is carried out in the extrusion device at a pressure of between 0.25 MPa and 0.3 MPa.

In another aspect, the present invention provides an extrusion device suitable for carrying out the above described method. The device comprises a barrel, said barrel having an internal surface, said internal surface defining a hollow cavity within said barrel, at least one screw means rotatable in, and extending longitudinally with respect to, said hollow cavity, said barrel having opposed first and second end regions, polymeric material feed means disposed in said first end region, said feed means communicating with said hollow cavity, powder discharge means disposed in said second end region, said discharge means also communicating with said hollow cavity, a plurality of zones defined with said cavity intermediate said first and second end regions, heating means in thermal communication with at least said first zone, cooling means in thermal communication with at least said second zone and pre-crushing and pulverising means disposed in said second zone.

Preferably, said at least one screw means comprises two screws, each said screw including core means disposed longitudinally within said cavity and flight means disposed helically around said core means, said flight means on said two screws meshing with one another to produce a self-cleaning effect.

The cooling is effected by intensively cooling the cylinder. This may be effected by means of circulatory cooling systems. The screw itself may also be cooled.

Desirably, the extrusion device additionally comprises kneading disc means mounted on said screw means in said pre-crushing and pulverising zone, said disc means defining apices, said apices being located adjacent said internal wall of said barrel.

In one embodiment said kneading disc means comprise a plurality of individual discs, said individual discs being generally elliptical, said ellipse defining a major axis, said major axis having opposed end regions, said disc, in said opposed end regions, terminating in apices, said apices being located adjacent said internal surface of said barrel.

In an alternative embodiment said kneading disc means comprise a plurality of individual discs, said individual discs being generally triangular, the sides of said triangle being arcuate, the apices of said triangle being located adjacent said internal surface of said barrel.

In either case, it is preferable if said individual discs are mounted on said screw means in a longitudinal array, said discs being angularly offset with respect to one another such that corresponding ones of said apices describe a helical line.

Further desirably, said apices of said discs means and said interior surface of said barrel jointly define a spacing, said spacing being variable by selecting an appropriate size for said discs in dependence upon the at least one of the characteristics of said material and the desired characteristics of the powder to be produced.

Further advantageously, said apices of said discs are contoured in correspondence to the configuration of said internal surface of said barrel.

BRIEF DESCRIPTION OF THE DRAWINGS

One embodiment of a twin-screw extruder which is particularly suitable for carrying out the method in accordance with the present invention will be further described, by way of example, with reference to the accompanying drawings, in which.

DESCRIPTION OF PREFERRED EMBODIMENTS

Figure 1:
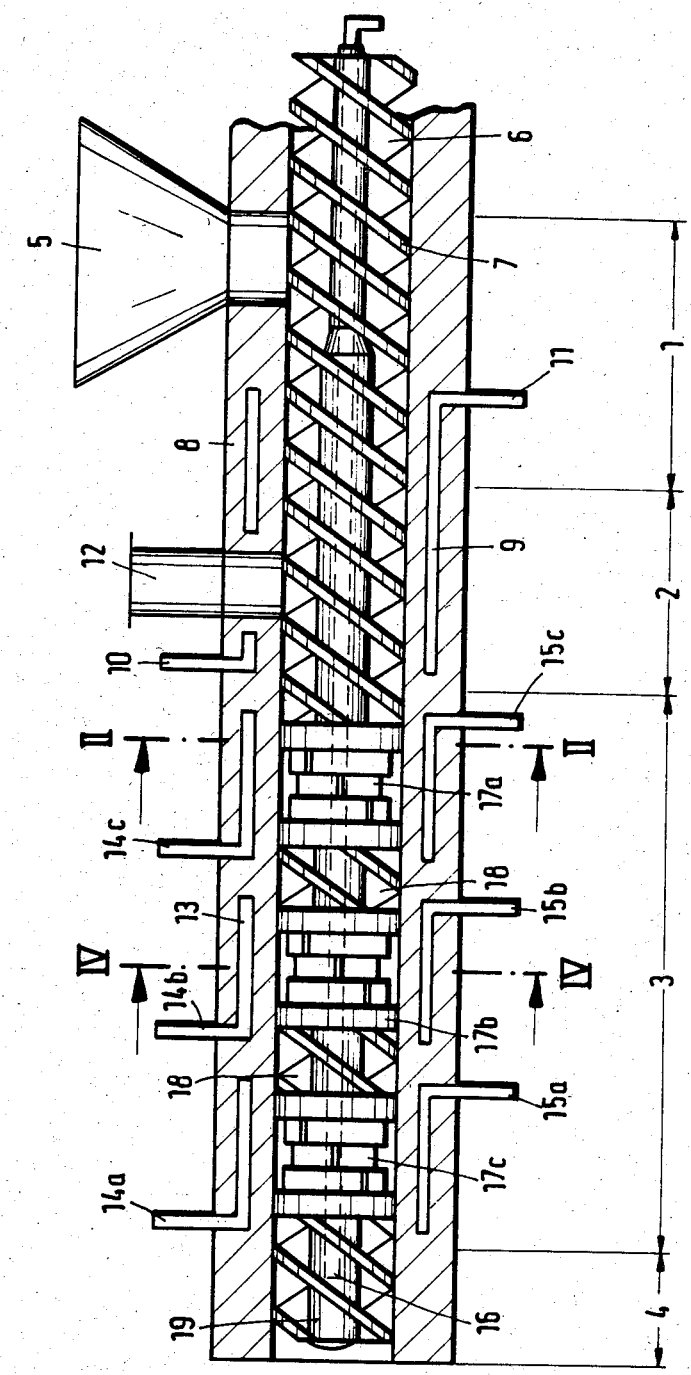
FIG. 1 is a schematic side view, partially in section, of a twin-screw extruder in accordance with the present invention.

In FIG. 1, there is shown a twin-screw extrusion device which is divided into four zones. These zones, which are traversed successively by the polymeric material, are a fusion zone 1, a degassing zone 2, a cooling zone 3, and a discharge zone 4.

The polymer to be pulverised or fine-ground is fed, in granular form, into the fusion zone 1 of the extrusion device through a feed hopper 5. From the hopper 5 it is conveyed forwardly further by the screws 6 (only one of which is visible in FIG. 1.) Each screw 6 has a screw flight 7 disposed helically therearound. The granular material is fused in such zone 1 by shearing energy which is induced therein.

The screws 6 are located in the hollow interior of a barrel 8 and the fusion process is assisted by heating the barrel 8. Such heating is effected by means of tempering conduits 9 which are formed therein. A heating medium is supplied to the conduits through a feed conduit 10 and is removed therefrom by a discharge conduit 11. Accordingly, a circulatory system for the tempering or heating medium may be utilised.

The material being processed is then conveyed by the screws 6 into the degassing zone. This zone 2 is provided with a degassing conduit 12 connected to means for producing a vacuum or a reduced pressure. This zone 2 is used for removing, for example, moisture and residual monomers. However, depending upon the material being treated, the degassing zone 2 may not be necessary and may therefore be omitted.

Thereafter, the screws 6 convey the material into the cooling zone 3. In the wall of the barrel 8, cooling conduits 13 are provided. Through these conduits 13, a coolant, such as water, is passed. The coolant is fed into the conduits 13 through feed conduits 14a, 14b, 14c and is discharged through corresponding discharge conduits 15a, 15b, 15c. The conduits 13 ensure a circulation of the coolant so that efficient cooling is achieved.

In the cooling zone 3, the screws 6 are additionally cooled by means of a bore system 16 which permits circulatory cooling, one bore 16 extending longitudinally along the axis of the screw 6 being visible in FIG. 1.

Kneading discs 17 are non-rotatably mounted on the screws 6 in the cooling zone 3. As shown in FIG. 1, three groups of discs 17a, 17b and 17c, spaced apart in the direction of travel of the material, are provided, each group comprising a plurality of discs. Between adjacent groups of discs 17a and 17b and 17b and 17c, screw conveyor portions 18 are provided for forwarding the pulverised material. The kneading or pulverising discs may be either approximately elliptical with end regions tapering to apices (as shown in FIGS. 2 and 3) or approximately triangular with curved sided tapering to apices (as shown in FIGS. 4 and 5).

Figure 2:
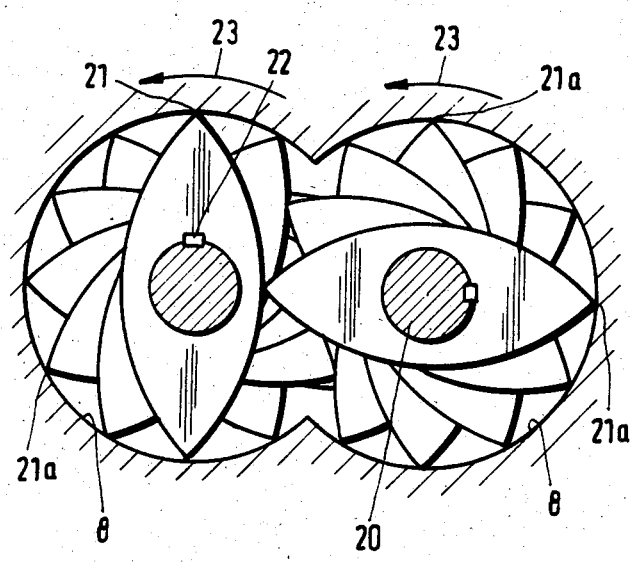
FIG. 2 is a cross-sectional view taken along the line II—II of FIG. 1.
Figure 3:
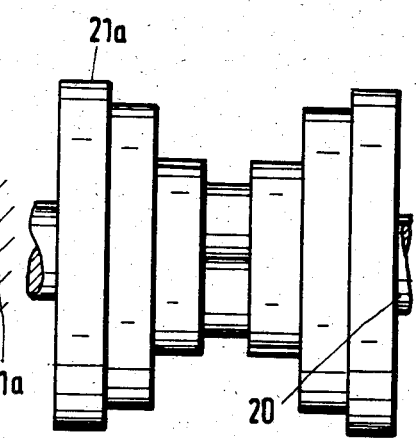
FIG. 3 is a plan view of the portions of the extruder visible in FIG. 2.

FIG. 2 is a cross-sectional view of substantially elliptical discs 21. These discs are non-rotatably mounted on the screw shaft 20 by means of adjustment springs 22. These discs 21 are disposed one behind the other when viewed in the longitudinal direction of the extruder. However, they are angularly offset with respect to one another so that the apices of the discs form a double helix about the screw core. This arrangement initially subjects the material to comminution between the apices 21a of the discs and the cooled internal wall of the cylinder 8 but also permits the material to be conveyed forwardly, in a longitudinal direction, because the apices 21a are angularly offset.

In a double-screw arrangement, as shown in the drawings, the powder is additionally transferred transversely between the two screws, as is indicated by arrows 23.

Figure 4:
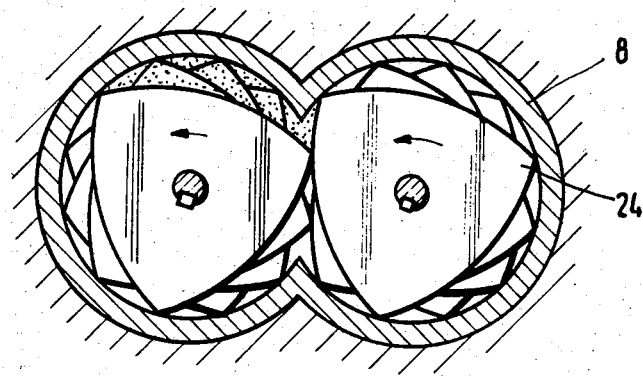
FIG. 4 is a cross-sectional view taken along the line IV—IV of FIG. 1.
Figure 5:
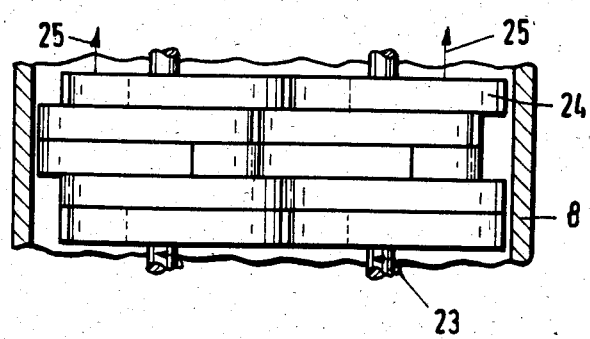
FIG. 5 is a plan view of the portions of the extruder visible in FIG. 4.

FIGS. 4 and 5 illustrate the substantially triangular discs which operate in substantially the same manner as the substantially elliptical discs except that three-fold comminution between the cooled cylinder 8 and the apices 24 of each disc is achieved.

As can best be seen in FIG. 4, the substantially triangular discs 24 are also disposed on behind the other in the longitudinal direction of the extruder and the apices of adjacent discs are angularly offset with respect to one another. This permits the pulverised material to be longitudinally conveyed, as is indicated by arrows 25 in FIG. 5.

The powder is finally conveyed into the discharge zone 4 wherein a screw portion 19 effects the discharge of the powder from the extruder.

The method of the present invention for pulverising polyethylene was carried out in the apparatus shown in FIG. 1, with the following parameters being observed.

| | |
|---|---|
| Temperature in the fusion zone 1: | About 140° C. to 150° C. |
| Temperature in the degassing zone 2: | About 140° C. |
| Temperature in the cooling, pre-crushing and pulverising zone 3: | |
| At the first group of kneading discs 17a: | 70° C. to 90° C. |
| At the second group of kneading discs 17b: | 50° C. to 70° C. |
| At the third group of kneading discs 17c: | 20° C. to 30° C. |

The pressure in the pulverising zone was between 0.25 MPa and 0.3 MPa.

The polyethylene to be pulverised had a fusion index of from 0.3 to 7 and was pulverised in a twin-screw extruder having a screw diameter of 53 mm and a screw length of 1484 mm (28 times the screw diameter). An output of between 40 and 50 kg/h was achieved and analysis of the polyethylene powder revealed that the proportion of powder particles larger than 160μ was only 2%.

We claim:

1. A method of producing a powder from polymeric material in an extrusion device, said extrusion device comprising a barrel having an internal surface defining a hollow cavity extending longitudinally within said barrel, screw means rotatable in and extending longitudinally with respect to said hollow cavity, said barrel having opposed first and second end regions, polymeric material feed means disposed in said first end region and communicating with said hollow cavity, powder discharge means disposed in said second end region and also communicating with said hollow cavity, said hollow cavity, intermediate said first and second end regions, being divided into at least first and second zones, heating means in thermal communication with at least said first zone and cooling means in thermal communication with at least said second zone, comprising the steps of:
    (a) feedng said material into said first end region and said first zone;
    (b) heating said material in said first zone to above the fusion temperature of said material;
    (c) conveying said fused material into said second zone;
    (d) cooling said material in said zone to a temperature below the solidification temperature of said material;
    (e) simultaneously pre-crushing and pulverising said solidified material in said second zone to form a powder; and
    (f) discharging said powdered material from said second end region,
    said fusion, cooling, pre-crushing and pulverisation being effected in a continuous operation in said extrusion device.

2. A method as recited in claim 1, in which said fused polymer is cooled in said second zone to a temperature lying in the range of 1.5° C. to 100° C. below the solidification temperature of the fused mass.

3. A method as recited in claim 2, wherein said fused polymer is cooled in said second zone to a temperature lying in the range of 3° C. to 40° C., especially about 10° C., below the solidification temperature of the polymer at which temperature the polymer ceases to flow.

4. A method as recited in claim 1, wherein said polymer is pre-crushed and pulverised at a pressure between 0.25 MPa and 0.3 MPa in said second, cooled zone of said extrusion device.

5. A method as recited in claim 1, wherein additives are added to said polymers.

6. A method as recited in claim 1, comprising the additional step of degassing said fused material prior to cooling said fused material.

* * * * *